(12) United States Patent
Kawaguchi et al.

(10) Patent No.: US 6,697,498 B2
(45) Date of Patent: Feb. 24, 2004

(54) METHOD AND COMPUTER PROGRAM PRODUCT FOR HIDING INFORMATION IN AN INDEXED COLOR IMAGE

(75) Inventors: Eiji Kawaguchi, Fukuoka (JP); Richard Eason, Orono, ME (US); Michiharu Niimi, Kitakyushu (JP)

(73) Assignee: ASA Systems, Inc., Fukuoka (JP)

(*) Notice: Subject to any disclaimer, the term of this patent is extended or adjusted under 35 U.S.C. 154(b) by 556 days.

(21) Appl. No.: 09/776,172

(22) Filed: Feb. 2, 2001

(65) Prior Publication Data
US 2002/0031241 A1 Mar. 14, 2002

Related U.S. Application Data
(60) Provisional application No. 60/180,330, filed on Feb. 4, 2000.

(51) Int. Cl.⁷ ................................................ G06K 9/00
(52) U.S. Cl. ....................... 382/100; 358/3.09; 382/162
(58) Field of Search ............................. 382/100, 240, 382/232, 233, 245, 246, 248, 250, 162, 163, 166, 167; 375/240.01, 240.11, 240.03, 240.23; 358/1.9, 2.99, 3.09; 348/463, 603, 642

(56) References Cited
U.S. PATENT DOCUMENTS

| | | | | |
|---|---|---|---|---|
| 4,847,677 A | * | 7/1989 | Music et al. ............ | 375/240.01 |
| 4,857,993 A | * | 8/1989 | Music et al. ............ | 375/240.01 |
| 5,446,806 A | * | 8/1995 | Ran et al. .................... | 382/240 |
| 5,517,335 A | * | 5/1996 | Shu ............................ | 358/518 |
| 5,594,839 A | * | 1/1997 | Shu ............................ | 358/1.9 |
| 5,652,626 A | * | 7/1997 | Kawakami et al. ......... | 348/463 |
| 5,684,885 A | * | 11/1997 | Cass et al. ................... | 382/100 |

* cited by examiner

Primary Examiner—Timothy M. Johnson
Assistant Examiner—Seyed Azarian
(74) Attorney, Agent, or Firm—Michael J. Persson; Lawson & Persson, P.C.

(57) ABSTRACT

A method and computer program product for embedding information within an indexed color image such that the existence of the data is not recognizable by the human eye. The method includes the steps of altering color image data, such that it will not cause a large color change in the representing image, and hiding information using an information hiding method. The altering step is accomplished via a color set changing method. The color set changing method involves first decomposing the image in to a set of color component images, embedding data in the color component or components, which the human visual system is most sensitive to, then merging representative colors until the number of representative colors is less than or equal to the target number of colors and reformatting the resulting image into indexed color image format.

20 Claims, 4 Drawing Sheets

Original Color-Index

```
00000001: x₁
00000010: x₂
00000011: x₃
00000100: x₄
00000101: x₅
00000110: x₆
00000111: x₇
00001000: x₈
................
................
```

Original Color

Re-arranged Color-Index

```
00000001: x₁
00000010: x₂
00000011: x₃
00000100: x₄
00000101: x₅
00000110: x₆
00000111: x₇
00001000: x₈
................
................
```

Re-arranged Color

METHOD AND COMPUTER PROGRAM PRODUCT FOR HIDING INFORMATION IN AN INDEXED COLOR IMAGE

CLAIM OF PRIORITY

This patent application claims the benefit of priority, pursuant to 35 U.S.C. §119(e), of U.S. Provisional Patent Application Ser. No. 60/180,330, filed on Feb. 4, 2000.

FIELD OF THE INVENTION

The present invention relates to the field of steganography and in particular to steganography using an indexed color image.

BACKGROUND OF THE INVENTION

Digital images are becoming more and more commonplace, and nowhere are these images more prevalent than on the Internet's World Wide Web. The vast majority of today's World Wide Web pages are decorated with color images and, thus, people browsing through the Web no longer pay special attention to sites containing images or to the downloading of image data from the Web.

The abundance of digital images posted on the World Wide Web has led to the development of steganographic, or information hiding, programs aimed at invisibly marking copyrighted images to aid in enforcement of the copyright by the copyright owner. In recent years, several steganographic programs have been posted on the World Wide Web. Most of these programs use image data for the container, or carrier, of the confidential information and some use the least significant bits of the image data to hide the confidential information. Other programs embed the confidential information in a specific band of the spatial frequency component of the carrier, while still others make use of the sampling error in image digitization. However, each of these steganographic methods have a relatively small information hiding capacity, allowing only 5–15% of the carrier image to hide information. This capacity is generally sufficient for "water marking" or placing a digital "signature" onto computer data, but is generally insufficient for confidential human-to-human communications applications.

The explosion of the Internet has also increased concerns by network users over the security of Internet communications. For example, Internet e-mail is not a reliable means for sending confidential messages as these communications are easily intercepted. This ease of interception has led to the development and commercial distribution of many encryption programs. However, there are some cases when a user may wish to send a message to a person without the fact that a message has been sent being noticed by anyone else. Encrypting the message cannot solve this problem as encryption can hide the content of the message, but cannot hide the message data itself. Thus, anyone can intercept the "unreadable message" and know that a message has been transmitted between the parties. Though appearing to be innocuous, this type of information may be very important to people such as unscrupulous business competitors or securities dealers, or even to organized crime figures, who may be keeping the sender or receiver under surveillance. Therefore, there is a need for a way to transmit data without the risk of another intercepting either the content of the message or the fact that a message has been sent.

There are many types of image files that are commonly used in computers today. One group of image files are indexed color images, which utilizes a so-called "Color Index Table" to represent each pixel value, relating to color and brightness, in an indirect way. The image file in this image format carries two parts, a color index table and an index number array, sometimes referred to as an index value array. The color index table specifies a limited number of representative colors needed for representing the given image, and it also associates a unique index number for each color. The array of index numbers in indexed color image format corresponds to the pixel array in the image. It represents each pixel value by specifying the index number. A typical color index table uses no more than 256 different representative colors. Therefore, 8 bits can describe the index numbers. This means that the image data has 8 bits, which saves the computer memory for image storing and shortens the sending/receiving time through the Internet. Therefore, it is a considerable merit to use an indexed color image instead of a true color image that normally has 24 bits for each pixel. The disadvantage of using an indexed color image is that the image quality might not be quite as good as that of a true color image.

When image based steganography is used for confidential communication, a true color based technique may not be provide the desired level of secrecy, as people do not usually use such large image files. Accordingly, the transmission of a large image file might draw special attention from the people who see it. Conversely, an indexed color image in which information is steganographically embedded is less likely to draw attention. Therefore, there is a need for a method for performing steganography upon color images and, in particular, upon indexed color based images.

SUMMARY OF THE INVENTION

The present invention is a method for hiding confidential, or other, information in an indexed color image that is not only based on a programming technique, but also on a property of the human vision system. The present invention is useful for the transmission and reception of secure confidential communications where the data hiding capacity is not the primary concern.

The method of the present invention involves altering of color image data, such that the embedding of data does not cause a large color change in the representing image, and hiding information within the image using an information hiding method. One such method is the Bit Plane Complexity Segmentation Steganographic method, disclosed in the Applicants' co-pending patent application Ser. No. 09/316,883, titled LARGE CAPACITY STEGANOGRAPHY, which is hereby incorporated by reference. It is understood that other methods, such as the related PDCS method also disclosed in the above referenced application, may be utilized to achieve similar results. However, for purposes of illustration, the BPCS steganography method will be used herein when referring to information hiding methods.

The art of BPCS steganography lies in the fact that the human vision system can not perceive any meaningful information in the complex areas of each bit plane of an image. Complex areas are prevalent in less significant bit planes of an image. In natural images, such as digital photographs, these occur in low bit planes. BPCS steganography replaces bits of complex areas of the image with confidential, or other, information, leaving no visual evidence of the replacement.

In the BPCS method, the carrier image is called a "dummy" image or a "vessel" image. Each confidential file is segmented into a series of blocks having 8 bytes data each that are regarded as 8×8 image patterns. These blocks are called confidential blocks. The algorithm for embedding a file into a dummy image using the BPCS method involves the following steps:

1) Transforming the dummy image from a Pure-Binary Coding system (PBC) image to a Canonical Gray Coding system (CGC) image.
2) Segmenting each bit-plane of the dummy image into informative and noise-like regions by using a threshold value ($\alpha_0$); with a typical value being $\alpha_0=0.3$.
3) Arranging the confidential file into a series of confidential blocks.
4) If a block (S) is less complex than the threshold ($\alpha_0<0.5$), then conjugating to make it a block (S*) that is more complex than 1-$\alpha_0$. This conjugation may, for example, be performed via an exclusive "OR" process on the region with a checkerboard pattern, such as is described in the Applicant's co-pending patent application Ser. No. 09/316,883, titled LARGE CAPACITY STEGANOGRAPHY.
5) Embedding each confidential block into the noise-like regions of the bit-planes (or, replacing all the noise-like regions with a series of confidential blocks). If the block is conjugated, then recording it in a "conjugation map."
6) Embedding the conjugation map after the confidential file-embedding step.
7) Converting the embedded dummy image from CGC to PBC.

The decoding algorithm for performing the extracting operation of the confidential information from an embedded dummy image is simply the reverse procedure of the embedding steps.

In an indexed color image, however, the complex areas in each bit plane of the image, represented by the two-dimensional data array of color index numbers, do not correspond to the complex areas of the representing image. Furthermore, small changes in index value caused by embedding can cause extreme changes in color. Therefore, the BPCS steganographic method cannot be directly applied to indexed color images.

The present invention allows confidential, or other, information to be embedded within an indexed color image. This embedding may be accomplished by rearranging the color index table of an original indexed color image into a new color-index table where complex areas of the new indexed color image relatively correspond to the complex areas in the bit plane of the representing image. However, in the preferred embodiment of the invention, the embedding is accomplished by rearranging a color set of the original image and applying the BPCS steganographic method to the rearranged image.

Therefore, it is an aspect of the invention to provide an indexed color image with a method to make it available for BPCS steganographic techniques to hide confidential information.

It is a further aspect of the invention to provide a steganographic method that prevents third parties from becoming suspicious about the image being hidden with some data other than the obvious image data itself.

It is a further aspect of the invention to provide a method that can hide confidential information in an invisible way for use in applications for sending or storing information.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Image complexity on each bit plane is a critical factor in the information hiding techniques used by the BPCS steganographic method (BPCS method, hereafter) and other similar methods. The problem of image complexity was discussed by Kawaguchi and Taniguchi in their paper "Complexity Of Binary Pictures And Image Thresholding", IEEE Trans. on PAMI, Vol. 5, No. 4, pp 373_384, 1988, incorporated herein by reference. Though this paper proposes three types of complexity measures, a black and white border measure of image complexity was found to be the best measure for the BPCS method.

Using the BPCS method to embed, or replace, some other data in an image does change the original true color image to some extent. However, because the BPCS method embeds data only in the complex areas of each bit plane of a true color image, the difference between the original and the embedded image is not noticeable to the human vision system. This property of the human vision system is crucial to the steganographic methods of the present invention.

Figure 1:
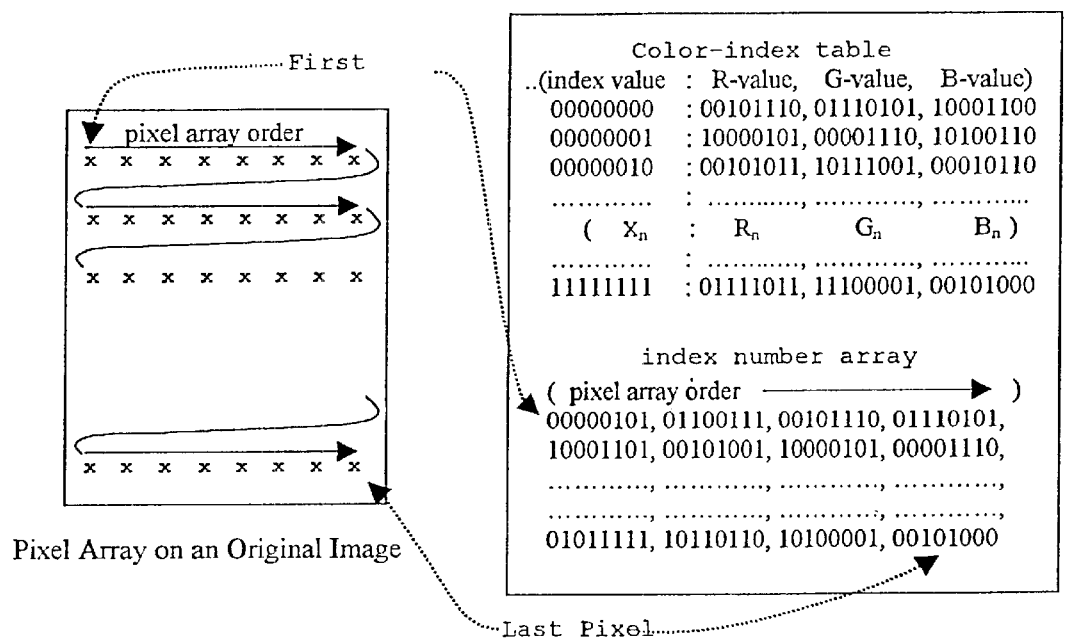
FIG. 1 is a diagrammatic view of the file format of an indexed color image and its relation to the pixel array of the image.

In the case of an indexed color image, such as is shown in FIG. 1, each representative color and its index number are unrelated. Therefore, even a small change in index number can cause a large color change in the representing image. Thus, if the BPCS method is applied directly onto the bit planes of the indexed image, the data embedding can be very obvious.

There are two techniques for solving this problem. The first may be characterized as a Non Color Set Changing (NCSC) method. Using this method, the color index number of each of the representative colors is changed such that the embedding of data does not cause a large color change in the representing image.

Figure 2:
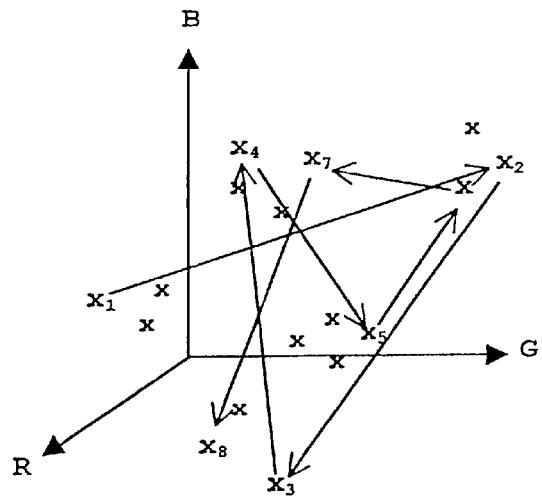
FIG. 2 is a diagrammatic view of the relation between the color index table and the original representative colors in Red, Green, and Blue space.

FIG. 2 illustrates the original color index table and the corresponding set of representative colors in Red, Green and Blue color space (designated as R, G, B space). As shown in FIG. 2, the color transition is very large and abrupt even for a sequence of small color index changes in the index table.

Figure 3:
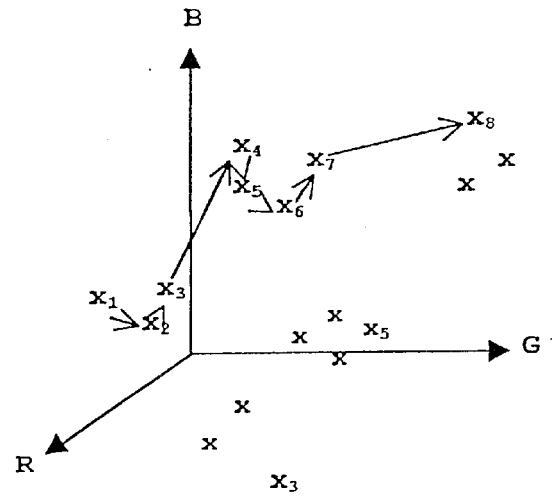
FIG. 3 is a diagrammatic view of the relation between the color index table and the representative colors after color index renumbering.

FIG. 3 illustrates a renumbering of the representative colors by index. The set of representative colors is unchanged, however, after the renumbering of the index numbers of the representative colors, the color transition is relatively small against the sequence of small color index changes. In this new situation, each representative color and its index number are related, so the BPCS method, or other art recognized steganographic methods, can be directly applied to the bit planes of the associated indexed color image.

Figure 4:
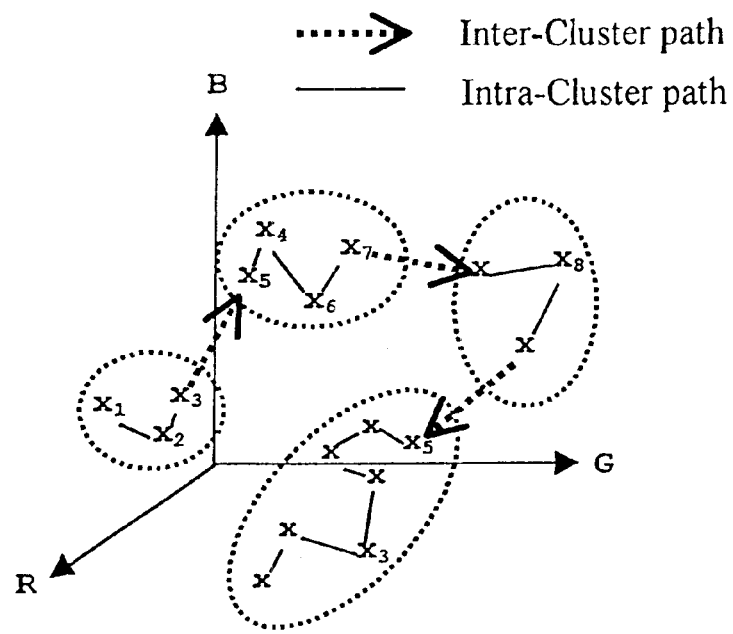
FIG. 4 is a diagrammatic view of an Inter and Intra Cluster path throughout the representative color set in Red, Green, and Blue space.

Renumbering of the index of representative colors may be accomplished via a number of different art recognized methods. One example is to use a pattern clustering method in R, G, B space. In this method, Inter-Cluster path finding and Intra-Cluster path finding algorithms are preferably used as seen in FIG. 4. Another renumbering method is to rearrange the representative colors in order of color brightness and using the resulting order as the order of color index numbers. Another renumbering method is to use the Hilbert Curve fitting method, which expands R, G, B space into a one-dimensional data array. Once expanded, this array becomes the color index array. Still another method is to use neural network methods that iteratively find a one-dimensional index array satisfying the property that a pair of similar index numbers corresponds to a pair of similar representative colors. It is noted that the aforementioned methods are presented as exemplary methods, and that those of ordinary skill in the art will recognize other ways to renumber the index numbers of the representative colors.

The present invention uses a second technique for embedding data that does not cause a large color change in the representing image. It is referred to as the Color Set Changing (CSC) method. This technique converts an index color image into color component images, which are made up of separate components of each color. These color components may take many forms, such as RGB (red, green, and blue), YUV, YIQ, CMY (cyan, magenta, yellow), CMYK (cyan, magenta, yellow, black), or other art recognized color components. Embedding is then performed in one, or sometimes two, of the color components. The embedding process will introduce new colors, which generally causes the number of colors to exceed the total number of colors in the palette. Therefore, the total number of colors in this palette is determined and is compared with the target number of colors for the palette. This target is not necessarily the original number of colors used in the indexed color image. In some embodiments, the target may be the maximum number of colors capable of being displayed by the user. However, in other embodiments, such as those for use with a variety of hardware and software types, the target number of colors is a number less than the maximum number of colors. The total number of colors is then reduced such that the total number of colors is less than or equal to the target number of colors. This reducing step is only performed in cases where the total number of colors exceeds the target number of colors in the palette. When performed, the reducing step includes a color-merging step, which reduces the number of colors to an acceptable number. Once the number of colors is reduced, the resulting image is converted back to an indexed image.

In this process, each color component image is either used for embedding, or its colors are merged during the color merging processing. Both operations involve degradation in color. However, the color merging process involves greatest degradation. Therefore, the present invention makes use of a property of the human visual system in order to minimize the perceived color change during the embedding process. In the many embodiments, embedding is performed in the color component image, or images, to which the human visual system is most sensitive. Color merging is then done in the other components.

In the following discussion, we assume that the original indexed color image contains a palette with RGB information. However, as noted above, the method of the present invention is readily adapted for application with color images indexed using different color components.

It is known that the human vision system is generally more sensitive to image brightness (Y) than to image hue. Therefore, one option is to convert the image to YIQ, or YUV, color space, and embed in the Y color component image using standard BPCS steganography or some comparable method. The color merging process involves merging colors that have the same Y, but different I and Q, or U and V, components. One of several techniques can be used to determine the replacement color when merging colors. These techniques include, for example, taking a straight average of the original colors, taking a weighted average of the colors based on the number of pixels having the color, and simply choosing the color that most pixels have. However, it is recognized that other clustering techniques can also be used to determine which colors to merge. During the preferred merging step, the nearest neighbors are merged first, and merging continues until the number of colors in the image is reduced by the desired amount. Each YIQ or YUV color vector is then converted back to RGB for storage in the palette.

The difficulty with this approach is that the conversion can introduce truncation error, and it is necessary that each Y component in the palette be recovered precisely when it comes time to extract the embedded information. It is noted that errors in I and Q, or U and V, will not affect extraction and, therefore, are not of great concern.

One technique for accomplishing this is to store the desired last three bits of the Y component directly in the last bits of each of the R, G, and B color components for that color in the palette. Later during extraction, the Y component can be recovered exactly from a RGB vector in the palette by computing its value and making a minor adjustment to its last three bits based on the last bits of R, G, and B.

A look at the relation between the Y component and the R, G, and B components suggests a simpler option, which is easier to implement. It is known that image brightness (Y) is related to the three primary colors, R, G, & B, by the following formula:

$$Y=0.299R+0.587G+0114B$$

As can be seen, green is the dominant color in the brightness equation. Accordingly, in order for an image adjusting operation, i.e. an image alteration on a small scale, to be kept invisible from human eyes, the Green color should remain unchanged, while the Red and Blue may be altered without having a great effect on overall image brightness. The Color Set Changing method of the present invention utilizes this rule in applying the BPCS method to indexed color images.

As above, in order for an image to be directly translated back into an indexed color image format after embedding, the total number of representative colors, such as 256 colors, must remain unchanged. Given this requirement, and the rule that the green component of each color remains unchanged during the color combination, the following method may be utilized:

Let S0 be a given indexed color image with 8 bits of data for each pixel value, i.e., each color index number.

Figure 5:
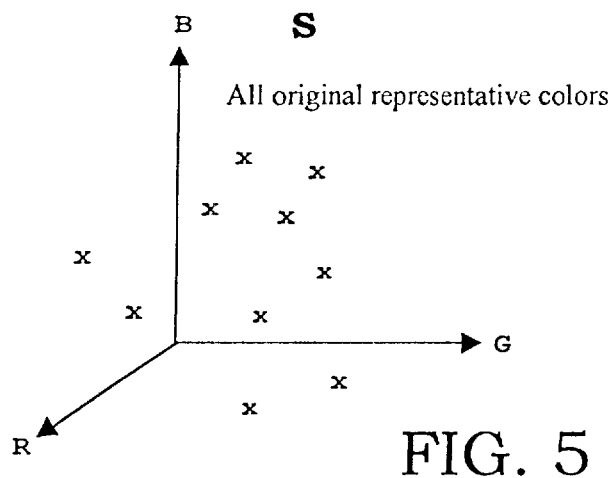
FIG. 5 is a diagrammatic view of an original representative color set before embedding.

The first step is to translate S0 into an R, G, B color image (S) having a fixed number of bits for each color, 8 bits in this example. The representative colors in S are illustrated in FIG. 5.

The second step is to embed confidential or other desired data into only the green bit planes of S while leaving the Red and Blue bit planes unchanged. This may be accomplished via the BPCS method, or other art recognized steganographic technique.

Figure 6:
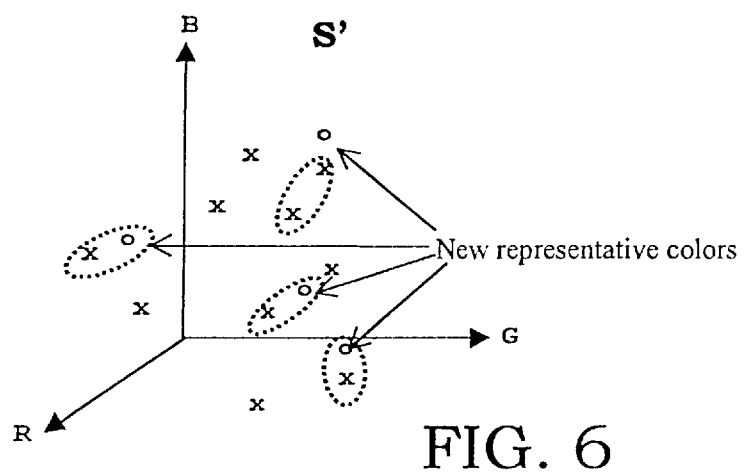
FIG. 6 is the diagrammatic view of the representative color set after data embedding.

As shown in FIG. 6, S' denotes the image after embedding. The embedding operation may generate several new representative colors, which increases the total number of representative colors in S' to more than the original 256 colors. Because of this increase, S' cannot be directly translated back into an indexed color image format.

Figure 7:
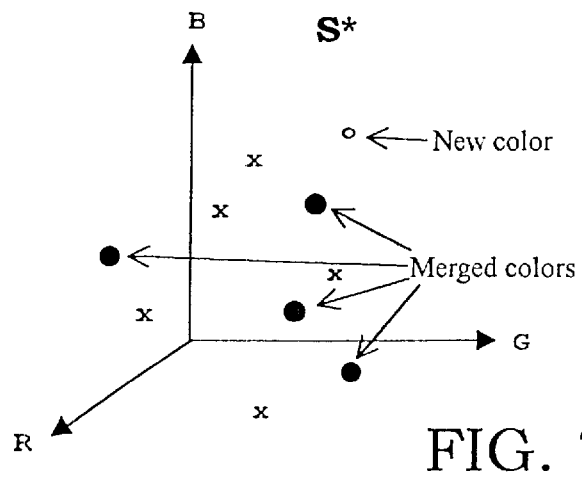
FIG. 7 is the diagrammatic view of the final reduced representative color set.

If S' has more than the original number of representative colors in S0, here 256 representative colors, the third step is to reduce the number of colors by detecting the pair of closest colors having the same green color component and merging the pair into one representative color. This reducing step results in the enclosed pairs denoted by dotted circles in FIG. 6. This color reducing step is then repeated until the number of representative colors is equal to the number of representative colors in S0; here 256. FIG. 7 shows the representative colors of new image S*, which result from the step of reducing the number of representative colors.

The fourth and final step in the embedding process is to recompose S* into an indexed color image S*0, which is now a data embedded indexed color image.

Information that has been embedded using the Color Set Changing method may be extracted, or decoded, by transforming S*0 to S* and using the decoding algorithm of the BPCS method. However, if a different method has been utilized to embed the data, the decoding algorithm for that method will be utilized.

Although the present invention has been described in considerable detail with reference to certain preferred versions thereof, other versions would be readily apparent to those of ordinary skill in the art. For example, it is recognized that the present methods may be readily adapted for use with other techniques for hiding information within the individual color components of the image. Further, it is readily recognized that the methods herein are intended to be computerized and may be include computer program means for performing the methods herein. Therefore, the spirit and scope of the appended claims should not be limited to the description of the preferred versions contained herein

What is claimed is:

1. A method for hiding information in an indexed color image comprising a palette having a target number colors, said method comprising the steps of:

decomposing said indexed color image into at least three images corresponding to three color components of said indexed color image, said images comprising a first color component image, a second color component image and a third color component image;

embedding said information into said first color component image, wherein said embedding step would result in a palette having a total number of colors if said first color component image, said second color component image and said third color component image were recomposed into said indexed color image;

comparing said total number of colors with said target number of colors to determine whether said total number of colors is greater than said target set of colors;

reducing said total number of colors such that said total number of colors is less than the sum of the target number of colors plus one; and recomposing said first color component image, said second color component image and said third color component image into an indexed color image;

wherein said reducing step is performed only when said total number of colors is greater than said target number of colors, and wherein said reducing step comprises the steps of detecting at least two colors having a same first color component, and merging said at least two colors into one representative color.

2. The method as claimed in claim 1, wherein said decomposing step comprises decomposing said image into a brightness component image, a second component image, and a third component image.

3. The method as claimed in claim 2 wherein said embedding step comprises embedding said information into said brightness component image.

4. The method as claimed in claim 3 wherein said recomposing step comprises the steps of recomposing said brightness component image, said second component image, and said third component image into an indexed color image such that said brightness component image is exactly recoverable during an extraction process.

5. The method as claimed in claim 4 wherein said recomposing step comprises the steps of recomposing said brightness component image, said second component image, and said third component image into an indexed color image having red, green, and blue components such that said brightness component image is exactly recoverable during an extraction process.

6. The method as claimed in claim 5 wherein said recomposing step comprises the steps of recomposing said brightness component image, said second component image, and said third component image into an indexed color image having red, green, and blue components such that a last three bits of said brightness component image are stored in a last three bits of each of said red, green and blue component images.

7. The method as claimed in claim 1, wherein said decomposing step comprises decomposing said image into a red component image, a green component image, and a blue component image.

8. The method as claimed in claim 7 wherein said embedding step comprises embedding said information into said green component image.

9. The method as claimed in claim 1 wherein said reducing step further comprises the steps of determining at least one two colors to be merged and determining a resulting color based upon an average of said colors to be merged.

10. The method as claimed in claim 1 wherein said reducing step further comprises that steps of determining at least one two colors to be merged, and determining a resulting color based upon a number of instances of each color to be merged.

11. A computer program product for controlling a computer for embedding information within an indexed color image comprising a palette having a target number colors, said computer program product comprising:

a recording medium readable by the computer;

means recorded on said recording medium for decomposing said indexed color image into at least three images corresponding to three color components of said colors of said indexed color image, said images comprising a first color component image, a second color component image and a third color component image;

means recorded on said recording medium for embedding said information into said first color component image such that said embedding would result in a palette having a total number of colors, if said first color component image, said second color component image and said third color component image were recomposed into said indexed color image;

means recorded on said recording medium for comparing said total number of colors with said target number of colors to determine whether said total number of colors exceeds said target set of colors;

means recorded on said recording medium for reducing said total number of colors such that said total number of colors is less than the sum of the target number of colors plus one; and means recorded on said recording medium for recomposing said first color component image, said second color component image and said third color component image into an indexed color image;

wherein said reducing means reduces said total number of colors only when said total number of colors is greater than said target number of colors, and wherein said reducing means comprises the means for detecting at least two colors having a same first color component, and means for merging said at least two colors into one representative color.

12. The computer program product as claimed in claim 11, wherein said means for decomposing comprises a means for decomposing said image into a brightness component image, a second component image, and a third component image.

13. The computer program product as claimed in claim 12, wherein said means for embedding comprises a means for embedding said information into said brightness component image.

14. The computer program product as claimed in claim 13, wherein said means for recomposing comprises a means for decomposing said brightness component image, said second component image, and said third component image into an indexed color image such that said brightness component image is exactly recoverable during an extraction process.

15. The computer program product as claimed in claim 14, wherein said means for recomposing comprises a means for decomposing said brightness component image, said second component image, and said third component image into an indexed color image having red, green, and blue components such that said brightness component image is exactly recoverable during an extraction process.

16. The computer program product as claimed in claim 15, wherein said means for recomposing comprises a means for recomposing said brightness component image, said second component image, and said third component image into an indexed color image having red, green, and blue components such that a last three bits of said brightness component image are stored in a last three bits of each of said red, green and blue component images.

17. The computer program product as claimed in claim 11, wherein said means for decomposing comprises means for decomposing said image into a red component image, a green component image, and a blue component image.

18. The computer program product as claimed in claim 17, wherein said means for embedding comprises means for embedding said information into said green component image.

19. The computer program product as claimed in claim 11, wherein said means for reducing further comprises a means for determining at least one two colors to be merged and means for determining a resulting color based upon an average of said colors to be merged.

20. The computer program product as claimed in claim 11, wherein said means for reducing further comprises means for determining at least one two colors to be merged, and means for determining a resulting color based upon a number of instances of each color to be merged.

* * * * *